United States Patent
Allemand et al.

[15] 3,703,638
[45] Nov. 21, 1972

[54] IONIZATION RADIATION DETECTOR SYSTEM FOR DETERMINING POSITION OF THE RADIATION

[72] Inventors: Robert Allemand, Grenoble; Christian Brey, Sassenage; Jean Jacobe, Montbonnot, all of France

[73] Assignee: Commissariat A L'Energie Atomique, Paris, France

[22] Filed: May 22, 1970

[21] Appl. No.: 39,763

[30] Foreign Application Priority Data

May 23, 1969 France.......................6917042

[52] U.S. Cl. ......250/83.6 R, 250/71.5 S, 250/83.3 R, 315/169 R
[51] Int. Cl................................................G01t 1/18
[58] Field of Search .....250/83.6 R, 83.3 R, 83.3 HP, 250/71.5 S, 71 R; 315/169 R

[56] References Cited

UNITED STATES PATENTS 3,359,421  12/1967  Perez-Mendez et al...............250/83.6 R
2,877,371  3/1959  Orthuber et al...... 250/71 R X Primary Examiner—James W. Lawrence
Assistant Examiner—Morton J. Frome
Attorney—Cameron, Kerkam & Sutton

[57] ABSTRACT

An X- and γ-radiation detector including a plurality of detecting cells. Each cell comprises an anode and two half-cathodes, the half-cathodes consisting of flat plates. The respective half-cathodes are arranged as othogonal elements so that by applying matrix technique the output of a particular cell can be selected to localize the radiation detected.

8 Claims, 4 Drawing Figures

IONIZATION RADIATION DETECTOR SYSTEM FOR DETERMINING POSITION OF THE RADIATION

The invention relates to a radiation detector system suitable for detection of X,γ, or β radiation.

One application of the system is to the angular localization and measurement of the intensity of radiation diffracted by a small sample for analysis irradiated by an X-ray beam. The conventional method, and in practice the only method hitherto used for analyzing the spatial distribution of the X or γ electromagnetic radiation of a small sample consists in sweeping space by a suitable detector disposed on the arm of a goniometer which can move angularly around the sample. Since the amount of charge corresponding to each particle to be detected is too low to be directly measured by a preamplifier (below a threshold of the order of $4 \times 10^{-15}$ coulombs) a proportional detector must be used, so as to take advantage of the coefficient of multiplication of the charges provided by this method of operation. The sweep method takes a long time and has many disadvantages, since measurements are not made simultaneously for all orientations.

There is a similar problem in X or γ mapping of a large sample (such as an organ). Hitherto a scanning method has been used in which the space in front of the sample is scanned by a detector having a collimation system appropriate to the kind of radiation. This method also has the aforementioned disadvantages, one of which is to take too long.

It is an object of the invention to provide a stationary detector system for electromagnetic and β radiations, which supplies information simultaneously for the whole of the space investigated.

To this end the invention provides a system which comprises, in a single enclosure of constant thickness occupied by a fluid, a plurality of identical cells disposed at regular intervals, each comprising a filamentary anode and two flat half-cathodes, and means for taking from the two half-cathodes, during the detection of a radiation, two electric pulses which are applied to a localizing device which provides a one-to-one correspondence between each cell and the association of two channels for outputting said pulses, a d.c. potential difference such that the cell operates proportionally being applied between the anode and the two half-cathodes of each cell.

Preferably the two half-cathodes have substantially the same area and are disposed at the same distance from the filamentary anode, so that identical means for taking electrical pulses can be used for each half-cathode.

The localising device may comprise a matrix network, the two electrical pulses from a cell being applied, one to a line, the other to a column of the network, and an addressing device for a pulse resulting at a point of the network.

Since localizing the signals are taken from the half-cathodes, the half cathodes may be at the D.C. potential of earth, thus greatly simplifying the problems of signal output, and the filamentary anodes are at that positive potential in relation to earth which is required for operation as a proportional counter.

In an embodiment of the invention the anodes are formed by one or more layers of wires, the wires of one layer all being parallel with one another, and the half-cathodes of the same cell are associated, one with a first group formed by parallel strips disposed in an identical plane, the other being associated with a second group also formed by parallel strips disposed in a plane parallel with the first plane, the strips of the first and second groups being disposed on either side of the layer of anode wires and at an equal distance from such layer.

In a first embodiment of the invention, the parallel strips of the first and second groups are parallel with the same direction, while in a second embodiment of the invention they are parallel with two perpendicular directions respectively.

The first arrangement disclosed hereinbefore is used in cases in which sweeping in one plane is required (the meridian plane in studying the diffraction spectrum of X or γ radiation).

In most cases the signals taken from the half-cathodes must be subjected to amplitude selection therefrom and processed to avoid errors caused by the action of the same event on a number of adjacent cells. Those errors must also be eliminated which are caused by the appearance on two cells of signals separated by an interval of time less than the resolution time of the input circuits of the counters associated with the cells. To this end inhibition circuits can advantageously be provided to prevent the recording of two events separated by an interval of time less than the recovery time of such circuits.

The invention will be more clearly understood from the following description of non-limitative exemplary embodiments thereof, with reference to the accompanying drawings, wherein.

Figure 1:
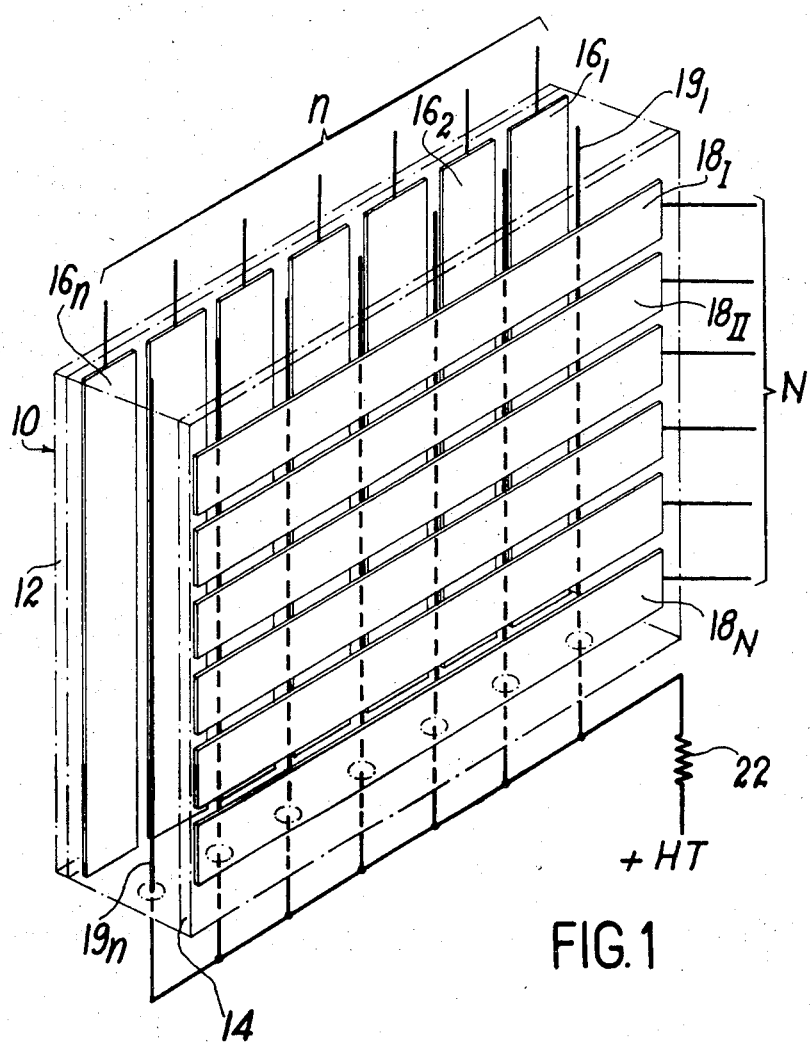
FIG. 1 is a diagrammatic perspective view of a detector adapted to azimuthal and elevational localization of the distribution of an X or γ radiation coming from a substantially point source.
Figure 3:
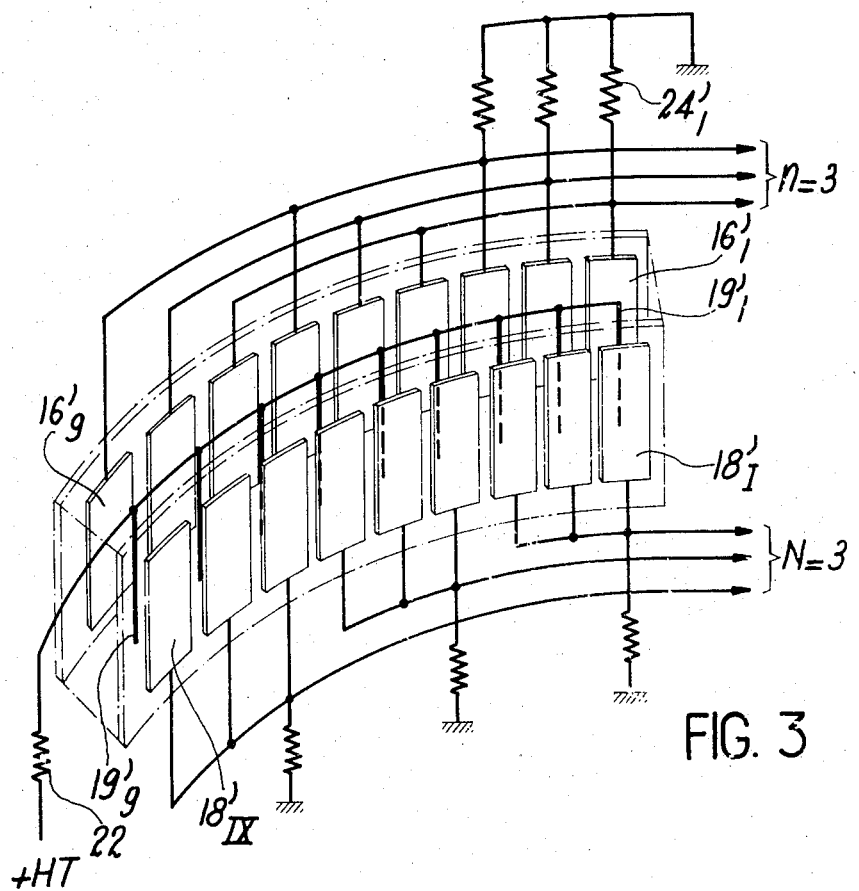
Figure 4:
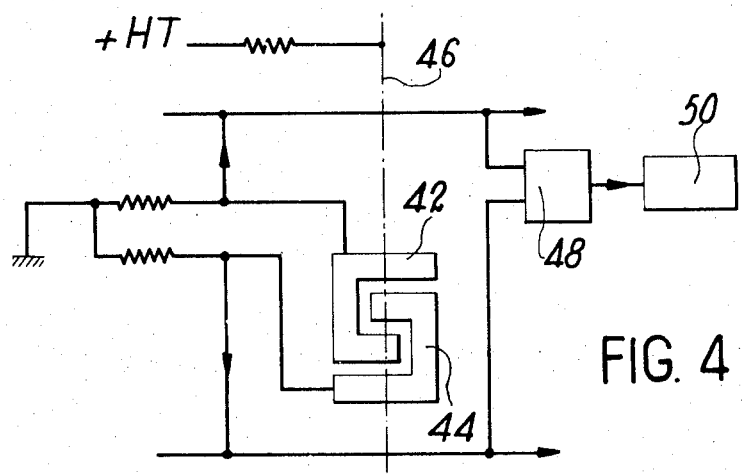

FIG. 3, which is similar to FIG. 1, shows a detector for exploration of a beam along a meridian plane of symmetry which can, for instance, be an azimuthal plane; and FIG. 4 is a detail showing the two half-cathodes of a cell associated with a detector according to a modified embodiment of the invention.

Figure 2:
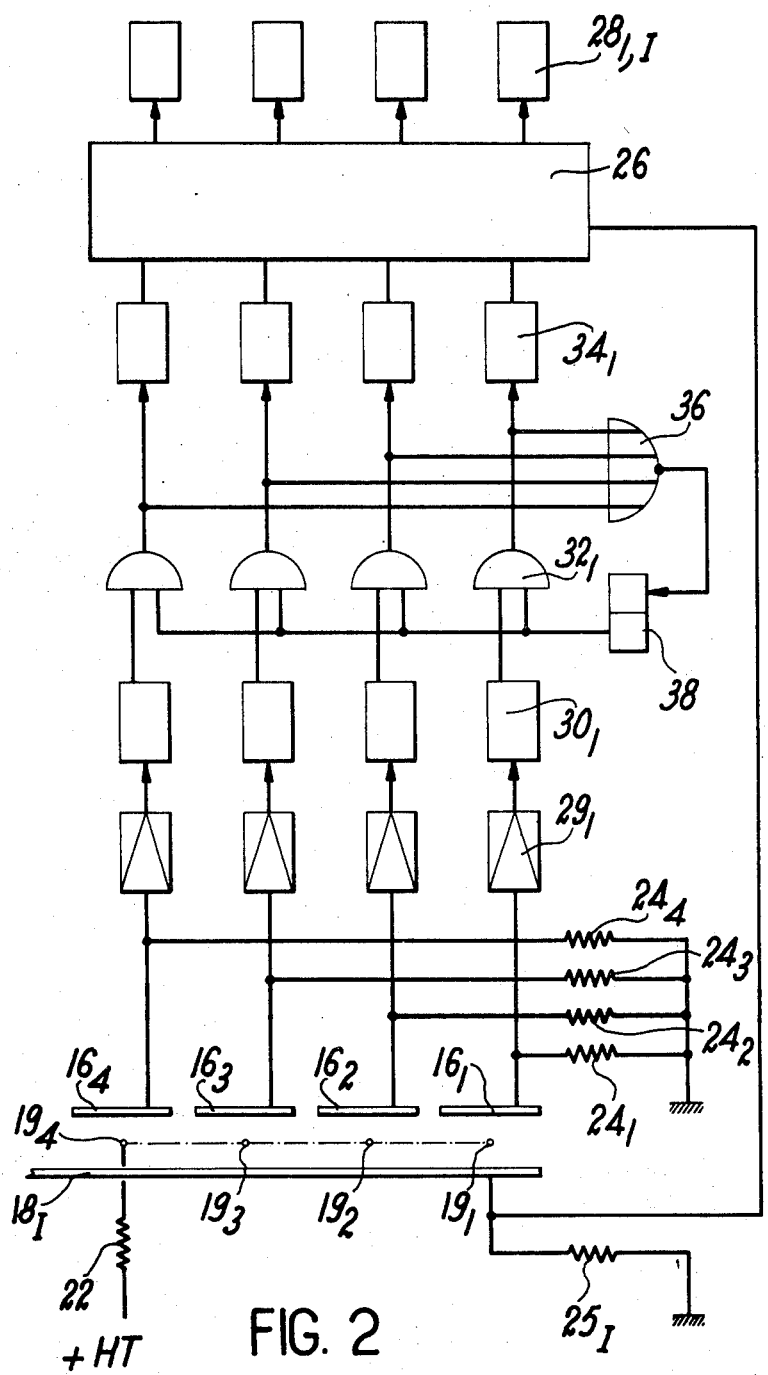
FIG. 2 is a diagram showing a fraction of the network of coincidence circuits and the matrix localizing network which are associated with the detector illustrated in FIG. 1.

The system illustrated in FIGS. 1 and 2 is adapted to determine the azimuthal and elevational angular distribution of the intensity of X or γ/radiation.

It can also be used for X,γ or β mapping of a sample whose dimensions are of the same order as the area of the detector. In that use a collimator, formed, for instance, by a plate of heavy material formed with suitably orientated orifices, is interposed between the detector and the sample. Collimators of this kind are currently used for γ or X mapping by means of static detectors such as spark chambers or scintillation scanning cameras.

Before giving a full description of the system according to the invention, it may be advantageous to recall a few facts about proportionally operating ionization detectors and the consequences derived therefrom by inventors.

It is known that when the amount of charge delivered by a particle to be detected in an ionisation chamber is too low to be directly measured by a preamplifier — i.e., lower than a value of the order of $4 \times 10^{-15}$ coulombs — the detector must operate proportionally to take advantage of the coefficient of multiplication of the charges due to the intense electric field around the anode: the result is highly efficient detection. On the other hand, hitherto this method of operation has meant that under proportional conditions the counter tubes must be of precisely determined geometry; the counter tubes as a rule take the form of a metallic cylinder a few centimeters in diameter which forms the cathode, and a wire a few tens of $\mu$ in diameter disposed along the axis of the cylinder and forming the anode of the counter tube. The multiplication zone for the electric charges due to sensing events is limited to a thin cylindrical volume (a few tens of $\mu$ in thickness) around the anode wire, namely the space in which the electric field is adequate for the primary electrons created by the radiation to acquire enough energy between two collisions to ionize fresh gas molecules occupying the detector enclosure. Whatever the place in the detector where the initial ionization occurs may be, everything takes place as if the charges were created in full in the vicinity of the anode wire. The amount of charges per unit of area (density of charges) produced by influence on the cylinder forming the cathode is therefore substantially constant for any given cross-section of the cylinder, although the amount varies along the given cross-section of the cylinder, although such amount varies along the cylinder and has its maximum at the level of the cross section where the multiplication of the charges around the anode took place. Consequently, if the cylinder forming the cathode of a conventional proportional counter tube is divided into two half-cylinders, the same quantity of charges will be created by influence on each half-cylinder.

In these conditions, the inventors saw the possibility of drawing from two half-cathodes the two items of information required to localize any event due to a radiation. Preferably, the two half-cathodes have the same area and are so arranged in relation to the anode that the charges created by influence on the two half-cathodes are substantially identical — i.e., the treatment networks for the signals collected can be identical — although such features are clearly non-limitative.

Due to this arrangement, the anode at high positive voltage can act simply as an amplifier, and all the data required can be drawn from the half-cathodes at D.C. earth potential, thus greatly simplifying the technology of the detector. More particularly, there is no need to provide guard rings, and the seal between the information outputs and the enclosure no longer have to stand up to the D.C. operational high voltage of the system, and the preamplifiers require no very high voltage filters.

Referring to FIG. 1, a detector comprises a shallow air tight enclosure 10 made of a low-absorption material. In the embodiment illustrated, the enclosure 10 (shown in chain-dot lines) is flat. As a matter of fact, the best theoretical shape for the detector to investigate radiation from one point is part-spherical, but as a rule such an embodiment is too complicated to be justifiable. However, the enclosure can easily be curved into a portion of a cylinder.

The enclosure 10, whose thickness can vary from a few millimeters to a few centimeters, is occupied by an atmosphere selected in dependence on the energy of the radiation to be detected. As a rule, xenon, krypton, argon or a mixture thereof will be used for X radiation.

The enclosure 10 is occupied by a number $N \times n$ of detection cells, $n$ being advantageously equal to N. Each of the cells comprises a first half-cathode borne by an insulating member 12 covering one of the major surface walls (the wall opposite the source) or forming such wall, and a second half-cathode borne by an insulating member 14 covering or forming the opposite surface. In the embodiment illustrated in FIG. 1, the first half-cathodes of N cells disposed in the same column are formed by a same metal strip disposed on the insulating support 12. There are provided $n$ identical metal strips $16_1, 16_2 \ldots 16_n$ parallel with one another and separated by equal intervals. Similarly, the second half-cathodes of $n$ cells grouped on the same line are formed by a metallic strip on the opposite insulating support, and there are N such strips $18_I, 18_{II} \ldots 18_N$ disposed perpendicularly to the strips $16_1, 16_2, \ldots 16_n$. Advantageously, the metal strips associated with the two groups have the same width and are disposed at the same distance apart.

The anodes are disposed in the median plane between the cathode strips.

In the embodiment illustrated in FIG. 1, the anodes are formed by a layer of wires $19_1, 19_2, \ldots 19_n$ parallel with the strips $16_1, 16_2, \ldots 16_n$ and disposed in the median plane thereof. Two superimposed planes of wires forming a grid could be used, each plane being formed by wires each disposed in the median plane of one of the strips of corresponding group.

A D.C. high voltage selected for the cells to operate proportionally is applied to each of the wires forming the anodes via a common resistor 22; similarly, each of the strips $16_1, 16_2, \ldots$ forming the first half-cathodes is earthed via a resistor $24_1, 24_2$, and each of the strips $18_I, 18_{II}, \ldots$ is earthed via a resistor $25_I, 25_{II}, \ldots$ In a system used as an X-ray detector having an energy higher than 20 KeV the strips of half-cathodes were formed by resilient printed circuit sheets (metal coating of $15\mu$ in thickness on $100\mu$ of tetrafluoroethylene). The distance between the two planes of half-cathodes was 3 cm, and the pitch between the cells was 8 mm. The diameter of the anode wires was $30\mu$ and the d.c. high voltage was about 4,000 volts for an argon atmosphere at 5 bars. The output surface was of sintered beryllium. The surface through which the X-rays enter the enclosure was made of "mylar" and supported by a collimator with parallel apertures.

To detect a hard $\beta$ radiation, it is preferable to use a mixture of argon and carbon dioxide at a few bars, and a high voltage of the order of 4,000 volts for the conditions set forth hereinbefore.

$N \times n$ counting cells, each corresponding to the coincidence between the information received on one line and one matrix column are associated with the detector illustrated in FIG. 1 via $N + n$ measuring channels (grouped in a matrix with $n$ lines and N columns).

An address system 26 enables this correspondence to be carried out. The numbers of order $l$ in a line and $c$ in the column are coded, for instance, in a coded decimal binary system, and by combining 1 and $c$ the address can be obtained, for instance, $y = 1 + \lambda c$, to which a pulse corresponding to the coincidence line 1, column $c$ is sent. $\lambda$ is a predetermined integer of sufficient value to prevent any ambiguity, preferably a whole power of 2.

As stated hereinbefore, false information must be eliminated which is due either to the action of the same nuclear event on a number of cells, or to the succession of two events on two different cells in a very short interval of time less than the resolution time of the input coincidence circuits of the counters; the consequence of the latter would be to record two events which did not really take place, in addition to two real events, the system being incapable of distinguishing that one of the four points disposed in a rectangle adjacent which the nuclear event took place.

To eliminate the first cause of error (the same nuclear event as a rule influences two or three cells), use can be made of the fact that the charges collected on the half-cathodes are the charges produced by the electrical influence of the displacement of the electrons in the gas, and that the quantity of charges collected therefore depends on the angle at which the half-cathodes are subjected to the displacement of electrons caused by the event. As a consequence, the erroneous information can be eliminated by amplitude discrimination.

To this end the circuit illustrated in FIG. 2 comprises amplitude discriminators and inhibition circuits adapted to eliminate the second cause of errors. To simplify the drawing, FIG. 2 shows only the inhibition circuits associated with four bands $16_1 - 16_4$.

A pulse from the strip $16_1$ is amplified by a preamplifier $29_1$ and applied to an amplitude discriminator $30_1$ whose threshold is selected in dependence on the energy of the radiation to be detected. The output of the discriminator $30_1$ is applied to one of the inputs of an AND circuit $32_1$ whose output controls a monostable $34_1$. The output of that monostable is applied to the address circuit 26 on one of the scalers or counting rate meters associated with the strip $16_1$. The outputs of all the AND circuits $32_1, 32_2, \ldots$ are also connected to a NOR circuit 36 which controls the change of state of the monostable 38 whose output is applied to the second input of each of the AND circuits $32_1, 32_2, 32_3$. Clearly, therefore, when a pulse appears on one of the strips $16_1, 16_2$, the output of the corresponding AND circuit $32_1, 32_2, \ldots$ actuates via the NOR circuit 36 the monostable 38 which cuts off all the AND circuits 32 during a suitable interval of time (for instance, 2 microseconds). This cutting off of the transfer channels to all the counters $28_{1,I}, 28_{1,II}, \ldots$ by the address circuit 26 after the appearance of a pulse on one of such channels takes place after about 20 nanoseconds when conventional integrated circuits are used: the risk of wrong information is therefore limited to the very slight probability that two channels will receive two pieces of information during an interval of time less than 20 nanoseconds. The monostables $34_1, 34_2, 34_3, \ldots$ enable a pulse of sufficient length to be maintained on the address circuit 26 to assure the routing and recording of the pulse by the corresponding counter $28_{1,j}$. A second NOR circuit (not shown) performs the same function as the circuit 36 for the strips $18_I, 18_{II}, \ldots 18_N$.

The detector illustrated in FIG. 1 enables the distribution of beams over an area to be explored: when it is acceptable to determine distribution along a meridian, the arrangement shown in FIG. 3 can be adopted. In FIG. 3 members corresponding to those shown in FIG. 1 have like reference numbers followed by the prime symbol.

The system shown in FIG. 3 comprises apart cylindrical enclosure 10' adapted to be placed with its central plane coinciding with the azimuthal plane to be investigated. The opposite walls of the cylinder are covered with insulating layers 12', 14' bearing the half-cathodes $16'_1, 16'_2, \ldots 16'_9$ and the half-cathodes $18'_I, 18'_{II}, \ldots 18'_{IX}$ respectively. The anodes $19'_1, 19'_2, 19'_9$ are formed by a set of nine parallel wires located on an arcuate plane, acting solely as charge amplifiers and equidistant from the two corresponding half-cathodes. The wires are brought to a high voltage by a resistor 22'. The system of nine aligned cells is associated with a matrix comprising $n = 3$ lines and $N + 3$ columns.

The half-cathodes $18'_I - 18'_{IX}$ are arranged in groups of three successive interconnected cathodes also connected to one of the N columns of a matrix network similar to that illustrated in FIG. 2. Clearly, the three successive interconnected half-cathodes might also be united into a single half-cathode shared by three cells.

Instead of disposing the two half-cathodes of the same cell on either side of the anode wire, they can be overlapped in the arrangement illustrated in FIG. 4 which shows a single cell: the two half-cathodes 42, 44 overlapping one another at the same distance from the anode 46, so that the events of creating a signal are substantially identical for the two half-cathodes of the same cell. One of the half-cathodes, for instance 42, supplies a column, while the other half-cathode 44 supplies a line. A signal processing and addressing device 48 similar to that illustrated in FIG. 2 is connected to the lines and columns and supplies the counters 50 associated with each cell.

As stated hereinbefore, the invention enables the whole of an area or a meridian to be explored simultaneously, the result being a substantial reduction in experimental time in comparison with the conventional systems. The number of measuring channels for $N \times n$ cells is only $N + n$: for a mosaic of 10,000 cells, there are 200 measuring channels, using only one square matrix. Although the detectors operate proportionally, the possible geometries are very various, since the filamentary anode acts only as a charge amplifier.

In the foregoing description, the pulses corresponding to a nuclear event localized in a cell of the detector are fed to a scaler associated with the cell; clearly, they can also be fed to a display system, for instance, an oscilloscope, at the point defined by the coordinates of the cell, in the form of a light spot, and the light intensity thus produced can be integrated either by using a long afterglow screen, or by photographing the screen with adequate exposure time.

What is claimed:

1. An ionizing detector system comprising an enclosure of substantially uniform thickness, a fluid in said enclosure, a plurality $N \times n$ of detector cells within the enclosure, (where N is a predetermined integer greater than 1 and $n$ is a predetermined integer greater than 1)

each cell comprising an anode wire, a first flat half-cathode and a second flat half-cathode located on the other side of the anode wire with respect to the first half-cathode, a first group of N generally flat metal strips providing the first half-cathodes of respective groups of $n$ cells and a second group of $n$ generally flat metal strips providing the second half-cathodes of respective groups of N cells, N × $n$ counting means each arranged to count pulses from a respective one of the N × $n$ detector cells, N first communication paths each connecting a respective strip of the first group to $n$ counting means through coincidence means, $n$ second communication paths each connecting a respective strip of the second group to N counting means through said coincidence means, and means for applying between the half-cathodes and the anode of each detector cell a D.C. potential difference such that each cell operates as a proportional counter.

2. A detector system according to claim 1, including inhibiting means for selecting one first path and one second path only in response to each ionizing event, comprising, on each first or second path, discriminator means and blocking means, said discriminator means delivering a signal when a pulse exceeding a predetermined threshold is applied thereto and said blocking means blocking transmission of pulses for a predetermined time period by all other first or second paths, respectively, in response to reception of said signal by the discriminator means.

3. A detector system according to claim 1, each counting means having an address $y = 1 + \lambda c$, wherein 1 is an even number between 1 and N designating the row associated with the cell, $c$ is an even number between 1 and $n$ designating the column associated with the cell, and $\lambda$ is a predetermined integer greater than N and including coincidence means delivering the address $y$ of the corresponding counting means in response to any combination of row and column.

4. A system as set forth in claim 1 wherein the half-cathodes are brought to d.c. earth potential, while the anode is brought to the d.c. high voltage.

5. A system as set forth in claim 1 wherein the two half-cathodes have substantially the same area and are disposed at the same distance from the filamentary anode.

6. A system as set forth in claim 1 wherein the anodes are formed by at least one layer of parallel wires.

7. A system as set forth in claim 1 wherein the first half-cathodes of the cells are a group of metal strips parallel with a first direction and the second half-cathodes are a group of strips located on the other side of the anodes and parallel to a second direction.

8. A system as set forth in claim 7 wherein the strips in one group are perpendicular to the strips in the other group.

* * * * *